US 011356659B2

(12) United States Patent
Huo et al.

(10) Patent No.: US 11,356,659 B2
(45) Date of Patent: Jun. 7, 2022

(54) VIDEO PICTURE COMPONENT PREDICTION METHOD AND APPARATUS, AND COMPUTER STORAGE MEDIUM

(71) Applicant: GUANGDONG OPPO MOBILE TELECOMMUNICATIONS CORP., LTD., Guangdong (CN)

(72) Inventors: Junyan Huo, Guangdong (CN); Shuai Wan, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/220,007

(22) Filed: Apr. 1, 2021

(65) Prior Publication Data

US 2021/0218958 A1    Jul. 15, 2021

Related U.S. Application Data

(63) Continuation of application No. PCT/CN2019/110633, filed on Oct. 11, 2019.
(Continued)

(51) Int. Cl.
*H04N 19/105*    (2014.01)
*H04N 19/117*    (2014.01)
(Continued)

(52) U.S. Cl.
CPC ......... *H04N 19/105* (2014.11); *H04N 19/117* (2014.11); *H04N 19/132* (2014.11); *H04N 19/176* (2014.11); *H04N 19/82* (2014.11)

(58) Field of Classification Search
None
See application file for complete search history.

(56) References Cited

U.S. PATENT DOCUMENTS 10,390,015 B2    8/2019    Hu et al.
10,419,757 B2    9/2019    Chen et al.
(Continued)

FOREIGN PATENT DOCUMENTS

CN        107580222 A    1/2018
CN        108464002 A    8/2018
(Continued)

OTHER PUBLICATIONS

International Search Report in the international application No. PCT/CN2019/110633, dated Dec. 30, 2019.
(Continued)

*Primary Examiner* — Dave Czekaj
*Assistant Examiner* — Shanika M Brumfield
(74) *Attorney, Agent, or Firm* — Perkins Coie LLP

(57) ABSTRACT

Provided are a video picture component prediction method and apparatus, and a computer storage medium. The method may comprise: acquiring a reference value set of a first picture component of a current block; determining, from the reference value set of the first picture component, multiple first picture component reference values; respectively carrying out first filtering processing on a sample value of a sample corresponding to each of the multiple first picture component reference values to obtain multiple filtered first picture reference sample values; determining reference values, corresponding to the multiple filtered first picture reference sample values, of a picture component to be predicted; according to the multiple filtered first picture reference sample values and the reference values of the picture component to be predicted, determining a parameter of a component linear model; according to the component linear model, carrying out mapping processing on a reconstruction value of the first picture component of the current block to obtain a mapping value; and according to the
(Continued)

mapping value, determining a prediction value of the picture component to be predicted of the current block.

28 Claims, 6 Drawing Sheets

Related U.S. Application Data

(60) Provisional application No. 62/744,747, filed on Oct. 12, 2018.

(51) Int. Cl.
*H04N 19/132* (2014.01)
*H04N 19/176* (2014.01)
*H04N 19/82* (2014.01)

(56) References Cited

U.S. PATENT DOCUMENTS

| | | | |
|---|---|---|---|
| 2018/0063527 A1* | 3/2018 | Chen | H04N 19/635 |
| 2018/0063531 A1* | 3/2018 | Hu | H04N 19/48 |
| 2018/0077426 A1 | 3/2018 | Zhang et al. | |
| 2018/0205946 A1 | 7/2018 | Zhang et al. | |
| 2020/0128272 A1* | 4/2020 | Jangwon | H04N 19/157 |
| 2020/0177911 A1* | 6/2020 | Aono | H04N 19/139 |
| 2020/0195970 A1* | 6/2020 | Ikai | H04N 19/186 |
| 2020/0260096 A1* | 8/2020 | Ikai | H04N 19/176 |
| 2021/0092396 A1 | 3/2021 | Zhang et al. | |
| 2021/0136392 A1* | 5/2021 | Ma | H04N 19/186 |
| 2021/0160514 A1* | 5/2021 | Ma | H04N 19/117 |
| 2021/0168403 A1* | 6/2021 | Abe | H04N 19/176 |
| 2021/0176478 A1* | 6/2021 | Na | H04N 19/11 |
| 2021/0176495 A1* | 6/2021 | Iwamura | H04N 19/176 |
| 2021/0227240 A1* | 7/2021 | Chen | H04N 19/119 |

FOREIGN PATENT DOCUMENTS

| | | | | |
|---|---|---|---|---|
| GB | 201802972 | * | 4/2018 | H04N 19/176 |
| WO | 2018039596 A1 | | 3/2018 | |
| WO | 2018045207 A1 | | 3/2018 | |
| WO | WO-2018053293 A1 | * | 3/2018 | H04N 19/117 |
| WO | 2018061588 A1 | | 4/2018 | |
| WO | 2018132710 A1 | | 7/2018 | |
| WO | WO-2019201232 A1 | * | 10/2019 | H04N 19/176 |
| WO | WO-2020014563 A1 | * | 1/2020 | H04N 19/593 |
| WO | WO-2020015433 A1 | * | 1/2020 | H04N 19/186 |
| WO | 2020053805 A1 | | 3/2020 | |

OTHER PUBLICATIONS

Chen J et al: "Algorithm Description of Joint Exploration Test Model 5", 5. JVET Meeting; Jan. 12, 2017-Jan. 20, 2017 Geneva; (The Joint Video Exploration Team of ISO/IEC JTC1/SC29/WG11 and ITU-T SG.16); URL: http://phenix.int-evry.fr/jvet, No. JVET-E1001, Feb. 9, 2017 (Feb. 9, 2017), XP030150647. 44 pages.

Supplementary European Search Report in the European application No. 19870849.7, dated Sep. 21, 2021. 9 pages.

Office Action of the Indian application No. 202127016627, dated Feb. 25, 2022. 6 pages with English translation.

* cited by examiner

VIDEO PICTURE COMPONENT PREDICTION METHOD AND APPARATUS, AND COMPUTER STORAGE MEDIUM

CROSS-REFERENCE TO RELATED APPLICATION

This is a continuation application of International Patent Application No. PCT/CN2019/110633 filed on Oct. 11, 2019 which claims priority to U.S. Patent Application No. 62/744,747, filed on Oct. 12, 2018, the disclosures of which are hereby incorporated by reference in their entirety.

BACKGROUND

With the increase of requirements of people on video display quality, novel video application forms such as high-definition and ultra-high-definition videos have emerged. With the increasing extension of such high-resolution high-quality video appreciation applications, requirements on video compression technologies have also increased. H.265/High Efficiency Video Coding (HEVC) is the latest international video coding standard at present. Compared with that of a previous-generation video coding standard H.264/Advanced Video Coding (AVC), the compression performance of H.265/HEVC is improved by about 50% but still cannot meet a rapid development requirement of video applications, particularly novel video applications such as ultra-high-definition and Virtual Reality (VR) videos.

A linear-model-based prediction method has been integrated in a coding tool for a next-generation video coding standard Versatile Video Coding (VVC), and a predicted chroma value of a chroma component may be obtained through a linear model according to a reconstructed luma component.

However, when a video component is predicted through a linear model, it is necessary to perform down-sampling processing by using sample values in a luma neighbouring region and find a maximum and a minimum from reference samples obtained by down-sampling to construct the linear model. Such a model construction manner is based on a relatively large number of neighbouring reference blocks and thus high in complexity, resulting in low chroma prediction efficiency and further influencing the video coding and decoding efficiency.

SUMMARY

Technical Field

Embodiments of the present disclosure relate to the technical field of video coding and decoding, and particularly, to a video picture component prediction method and device and computer storage medium. The complexity in video component prediction may be reduced, and the prediction efficiency may be improved, so that the video coding and decoding efficiency is improved.

The technical solutions of the embodiments of the present disclosure may be implemented as follows.

The embodiments of the present disclosure provide a video component prediction method, which may include the following operations.

A first picture component reference value set of a current block is acquired.

Multiple first picture component reference values are determined from the first picture component reference value set.

First filtering processing is performed on sample values of samples corresponding to the multiple first picture component reference values to obtain multiple filtered first picture reference sample values respectively.

To-be-predicted picture component reference values corresponding to the multiple filtered first picture reference sample values are determined, a to-be-predicted picture component being a picture component different from a first picture component.

A parameter of a component linear model is determined according to the multiple filtered first picture reference sample values and the to-be-predicted picture component reference values, the component linear model characterizing a linear mapping relationship for mapping a sample value of the first picture component to a sample value of the to-be-predicted picture component.

Mapping processing is performed on a reconstructed value of the first picture component of the current block according to the component linear model to obtain a mapped value.

A predicted value of the to-be-predicted picture component of the current block is determined according to the mapped value.

The embodiments of the present disclosure provide a video component prediction device, which may include an acquisition part, a determination part, a filtering part and a prediction part.

The acquisition part may be configured to acquire a first picture component reference value set of a current block.

The determination part may be configured to determine multiple first picture component reference values from the first picture component reference value set.

The filtering part may be configured to perform first filtering processing on sample values of samples corresponding to the multiple first picture component reference values, respectively, to obtain multiple filtered first picture reference sample values.

The determination part may further be configured to determine to-be-predicted picture component reference values corresponding to the multiple filtered first picture reference sample values, a to-be-predicted picture component being a picture component different from a first picture component, and determine a parameter of a component linear model according to the multiple filtered first picture reference sample values and the to-be-predicted picture component reference values, the component linear model characterizing a linear mapping relationship for mapping a sample value of the first picture component to a sample value of the to-be-predicted picture component.

The filtering part may further be configured to perform mapping processing on a reconstructed value of the first picture component of the current block according to the component linear model to obtain a mapped value.

The prediction part may be configured to determine a predicted value of the to-be-predicted picture component of the current block according to the mapped value.

The embodiments of the present disclosure provide a video component prediction device, which may include a memory and a processor.

The memory may be configured to store an executable video component prediction instruction.

The processor may be configured to execute the executable video component prediction instruction stored in the memory to implement a video component prediction method provided in the embodiments of the present disclosure.

The embodiments of the present disclosure provide a computer-readable storage medium, which may store an executable video component prediction instruction, configured to be executed by a processor to implement a video component prediction method provided in the embodiments of the present disclosure.

The embodiments of the present disclosure provide the video picture component prediction method. The video picture component prediction device may select the multiple first picture component reference values at first based on the directly acquired first picture component reference value set corresponding to the current block, perform filtering processing based on sample positions corresponding to the selected multiple first picture component reference values to obtain the multiple filtered first picture reference sample values, then find the to-be-predicted picture component reference values corresponding to the multiple filtered first picture reference sample values to obtain the parameter of the component linear model, construct the component linear model based on the parameter of the component linear model and further execute a prediction process of the to-be-predicted picture component by using the constructed component linear model. In a construction process of the component linear model, the multiple first picture component reference values are selected at first, then filtering processing is performed according to the positions corresponding to the selected multiple first picture component reference values, and the component linear model is further constructed. In such a manner, the workload of performing filtering processing on the samples corresponding to the current block is reduced, namely filtering operations are reduced, so that the complexity in construction of the component linear model is reduced, the complexity in video component prediction is further reduced, the prediction efficiency is improved, and the video coding and decoding efficiency is improved.

DETAILED DESCRIPTION

For making the objectives, technical solutions and advantages of the present disclosure clearer, the present disclosure will further be described below in combination with the drawings in detail. The described embodiments should not be considered as limits to the present disclosure. All other embodiments obtained by those of ordinary skill in the art without creative work shall fall within the scope of protection of the present disclosure.

Unless otherwise defined, all technological and scientific terms used in the present disclosure have meanings the same as those usually understood by those skilled in the art of the present disclosure. Herein, terms used in the present disclosure are only adopted to describe the embodiments of the present disclosure and not intended to limit the present disclosure.

The concepts of intra prediction, video coding and decoding and the like will be introduced below at first.

A main function of predictive coding and decoding is constructing a predicted value of a current block by using a reconstructed picture existing in space or time in video coding and decoding and only transmitting a difference value between an original value and the predicted value to achieve a purpose of reducing a transmitted data volume.

Figure 1:
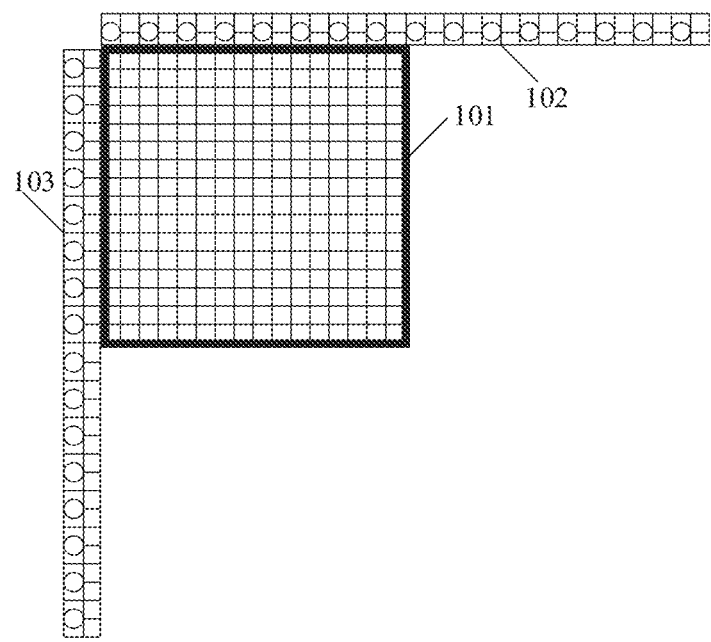
FIG. 1 is a schematic diagram of a relationship between a current block and an neighbouring reference sample according to an embodiment of the present disclosure.

A main function of intra prediction is constructing a predicted value of a current block by using neighbouring sample units in a row at the top and a column on the left of the current block. As shown in FIG. 1, each sample unit of a current block 101 is predicted by using recovered neighbouring samples (i.e., neighbouring sample units in a row 102 at the top and column 103 on the left of the current block) around the current block 101.

In the embodiments of the present disclosure, for a video picture, three picture components are usually adopted to represent processing blocks. The three picture components are a luma component, a blue chroma component and a red chroma component respectively. Specifically, the luma component is usually represented by a sign Y, the blue chroma component is usually represented by a sign Cb, and the red chroma component is usually represented by a sign Cr.

At present, a common sampling format for a video picture is a YCbCr format. The YCbCr format includes the following formats.

A 4:4:4 format represents that the blue chroma component or the red chroma component is not down-sampled. Four samples of the luma component, four samples of the blue chroma component and four samples of the red chroma component are extracted from every four continuous samples in each scan line.

A 4:2:2 format represents that 2:1 horizontal sampling is performed on the luma component relative to the blue chroma component or the red chroma component and vertical down-sampling is not performed. Four samples of the luma component, two samples of the blue chroma component and two samples of the red chroma component are extracted from every four continuous samples in each scan line.

A 4:2:0 format represents that 2:1 horizontal down-sampling and 2:1 vertical down-sampling are performed on the luma component relative to the blue chroma component or the red chroma component. Two samples of the luma component, one sample of the blue chroma component and one sample of the red chroma component are extracted from every two continuous samples in a horizontal scan line and a vertical scan line.

Under the condition that the 4:2:0 YCbCr format is adopted for a video picture, if a luma picture component of the video picture is a processing block with a 2N×2N size, a corresponding blue chroma component or red chroma component is a processing block with an N×N size, where N is a side length of the processing block. In the embodiments of the present disclosure, the following descriptions are made with the 4:2:0 format as an example. However, the technical solutions of the embodiments of the present disclosure are also applied to other sampling formats.

Figure 2:
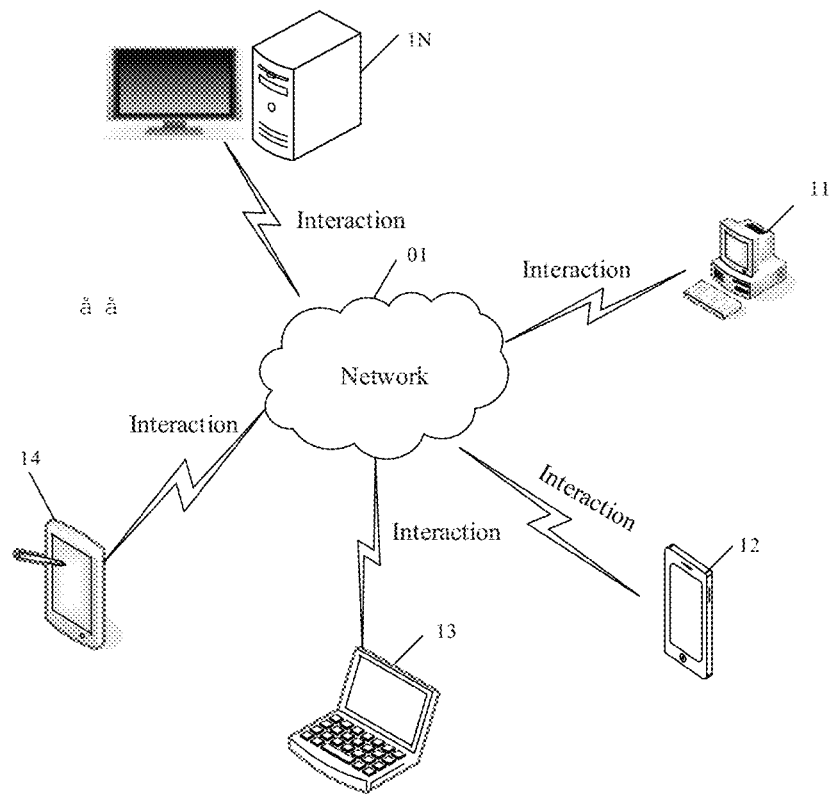
FIG. 2 is an architecture diagram of a video picture component prediction system according to an embodiment of the present disclosure.

Based on the above concepts, the embodiments of the present disclosure provide a network architecture of a video coding and decoding system including a video picture component prediction method for intra prediction. FIG. 2 is a composition structure diagram of a network architecture for video coding and decoding according to an embodiment of the present disclosure. As shown in FIG. 2, the network architecture includes one or more electronic devices 11 to 1N and a communication network 01. The electronic devices 11 to 1N may perform video interaction through the communication network 01. In an implementation process, the electronic device may be various types of devices with a video coding and decoding function. For example, the electronic device may include a mobile phone, a tablet computer, a personal computer, a personal digital assistant, a navigator, a digital phone, a video phone, a television, a sensing device, a server and the like. No limits are made in the embodiment of the present disclosure. An intra prediction device in the embodiment of the present disclosure may be the abovementioned electronic device.

The electronic device in the embodiment of the present disclosure has the video coding and decoding function and usually includes a video coder and a video decoder.

Figure 3A:
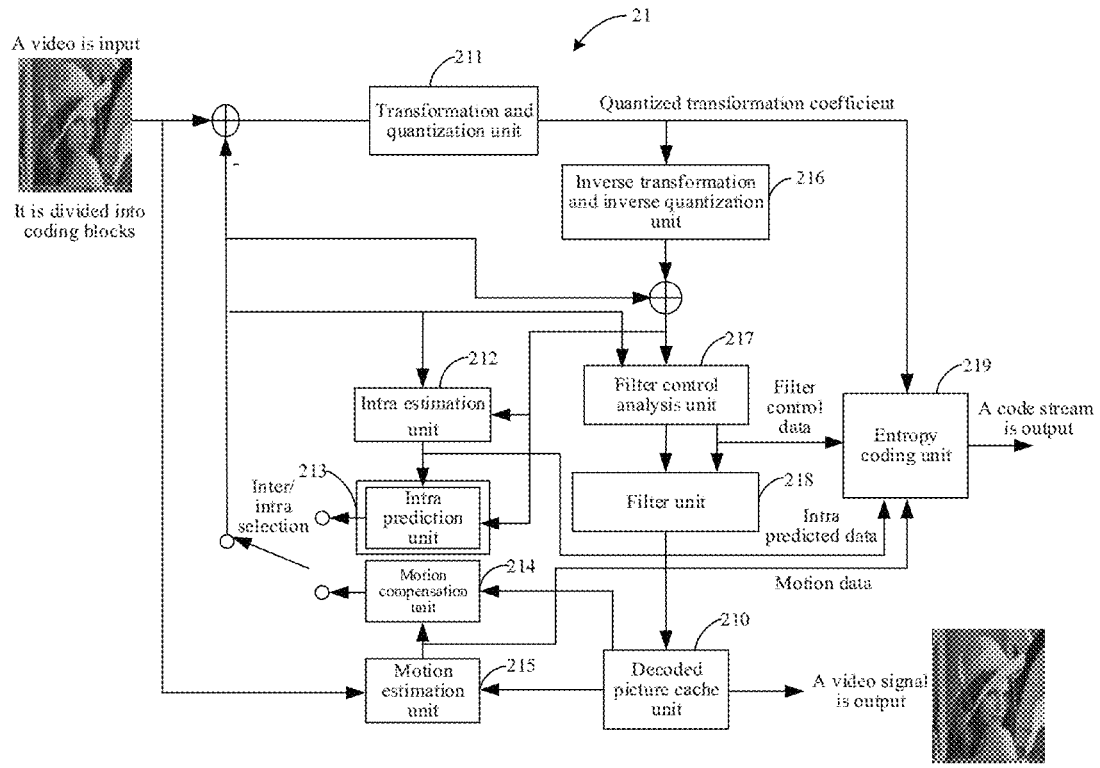
FIG. 3A is a composition block diagram of a video coding system according to an embodiment of the present disclosure.

Exemplarily, as shown in FIG. 3A, a composition structure of a video coder 21 includes a transformation and quantization unit 211, an intra estimation unit 212, an intra prediction unit 213, a motion compensation unit 214, a motion estimation unit 215, an inverse transformation and inverse quantization unit 216, a filter control analysis unit 217, a filter unit 218, an entropy coding unit 219 and a decoded picture cache unit 210, etc. The filter unit 218 may implement deblocking filtering and Sample Adaptive Offset (SAO) filtering. The entropy coding unit 219 may implement header information coding and Context-based Adaptive Binary Arithmetic Coding (CABAL). For input source video data, a to-be-coded block of a current video frame may be obtained by division of a Coding Tree Unit (CTU), and then residual information obtained by performing intra prediction or inter prediction on the to-be-coded block is transformed through the transformation and quantization unit 211, including transforming the residual information from a sample domain to a transformation domain and quantizing an obtained transformation coefficient to further reduce a bit rate. The intra estimation unit 212 and the intra prediction unit 213 are configured to perform intra prediction on the to-be-coded block, for example, determining an intra prediction mode to be adopted to code the to-be-coded block. The motion compensation unit 214 and the motion estimation unit 215 are configured to execute intra prediction coding on the to-be-coded block relative to one or more blocks in one or more reference frames to provide time prediction information. The motion estimation unit 215 is configured to estimate a motion vector. A motion of the to-be-coded block may be estimated according to the motion vector, and then the motion compensation unit 214 executes motion compensation based on the motion vector. After the intra prediction mode is determined, the intra prediction unit 213 is further configured to provide selected intra predicted data for the entropy coding unit 219, and the motion estimation unit 215 also sends motion vector data determined by calculation to the entropy coding unit 219. In addition, the inverse transformation and inverse quantization unit 216 is configured to reconstruct the to-be-coded block, namely a residual block is reconstructed in the sample domain, an artifact with a blocking effect in the reconstructed residual block is removed through the filter control analysis unit 217 and the filter unit 218 and then the reconstructed residual block is added to a predictive block in a frame of the decoded picture cache unit 210 to generate a reconstructed video coding block. The entropy coding unit 219 is configured to code various coding parameters and quantized transformation coefficients. In a CABAC-based coding algorithm, a context content may be configured to code information indicating the determined intra prediction mode based on neighbouring coding blocks to output a bitstream of the video data. The decoded picture cache unit 210 is configured to store the reconstructed video coding block as a prediction reference. As videos are coded, new reconstructed video coding blocks may be continuously generated, and these reconstructed video coding blocks may be stored in the decoded picture cache unit 210.

Figure 3B:
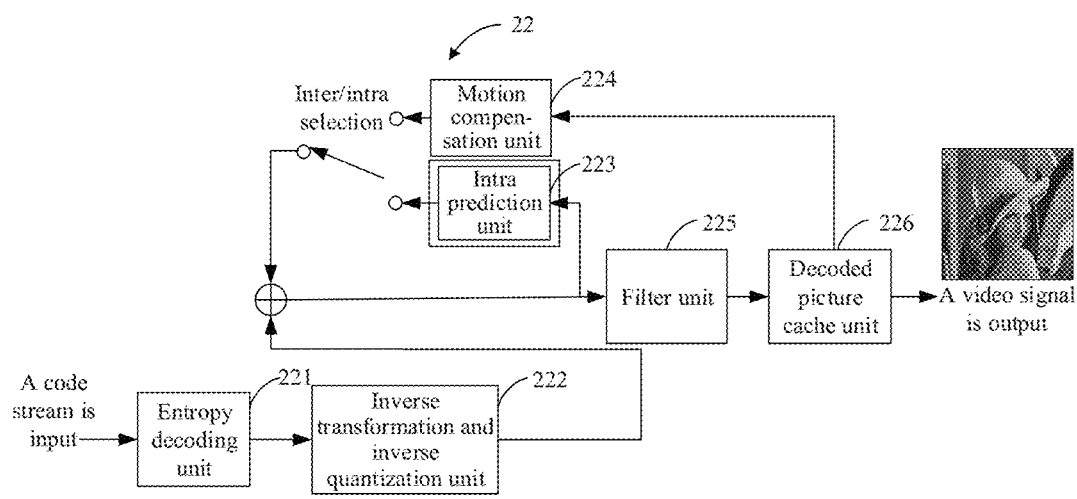
FIG. 3B is a composition block diagram of a video decoding system according to an embodiment of the present disclosure.

Referring to FIG. 3B, a composition structure of a video decoder 22 corresponding to the video coder 21 includes an entropy decoding unit 221, an inverse transformation and inverse quantization unit 222, an intra prediction unit 223, a motion compensation unit 224, a filter unit 225 and a decoded picture cache unit 226, etc. The entropy decoding unit 221 may implement header information decoding and CABAC decoding. The filter unit 225 may implement deblocking filtering and SAO filtering. After coding processing shown in FIG. 3A is performed on an input video signal, a bitstream of the video signal is output. The bitstream is input to the video decoder 22, and is processed through the entropy decoding unit 221 at first to obtain a decoded transformation coefficient. A residual block is generated in a sample domain by processing of the inverse transformation and inverse quantization unit 222 for the transformation coefficient. The intra prediction unit 223 may be configured to generate predicted data of a current coding block based on a determined intra prediction mode and data of a previous decoded block from a current frame or picture. The motion compensation unit 225 analyzes a motion vector and another associated syntactic element to determine prediction information for the current coding block and generates a predictive block of the current coding block that is presently decoded by using the prediction information. The residual block from the inverse transformation and inverse quantization unit 222 and the corresponding predictive block generated by the intra prediction unit 223 or the motion compensation unit 224 are summed to form a decoded video block. An artifact with a blocking effect in the decoded video block is removed through the filter unit 205, thereby improving the video quality. Then, the decoded video block is stored in the decoded picture cache unit 226. The decoded picture cache unit 226 stores a reference picture for subsequent intra prediction or motion compensation and is also configured to output and display a video signal.

Based on this, the technical solutions of the present disclosure will further be elaborated below in combination with the drawings and the embodiments. A video picture component prediction method provided in the embodiments of the present disclosure refers to prediction in an intra prediction process for predictive coding and decoding, may be applied to the video coder 21 and may also be applied to the video decoder 22. No specific limits are made thereto in the embodiments of the present disclosure.

In a next-generation video coding standard H.266, for further improving the coding and decoding performance and the coding and decoding efficiency, Cross-Component Prediction (CCP) is extended and improved, and Cross-Component Linear Model Prediction (CCLM) is proposed. In H.266, CCLM implements prediction from the luma component to the blue chroma component, from the luma component to the red chroma component and between the blue chroma component and the red chroma component. Implementation of the video component prediction method under the background of existing CCLM will be described below.

The embodiments of the present disclosure provide a video picture component prediction method. The method is applied to a video picture component prediction device. A function realized by the method may be realized by calling a program code through a processor in the video picture component prediction device. Of course, the program code may be stored in a computer storage medium. It can be seen that the video picture component prediction device at least includes the processor and the storage medium.

Figure 4:
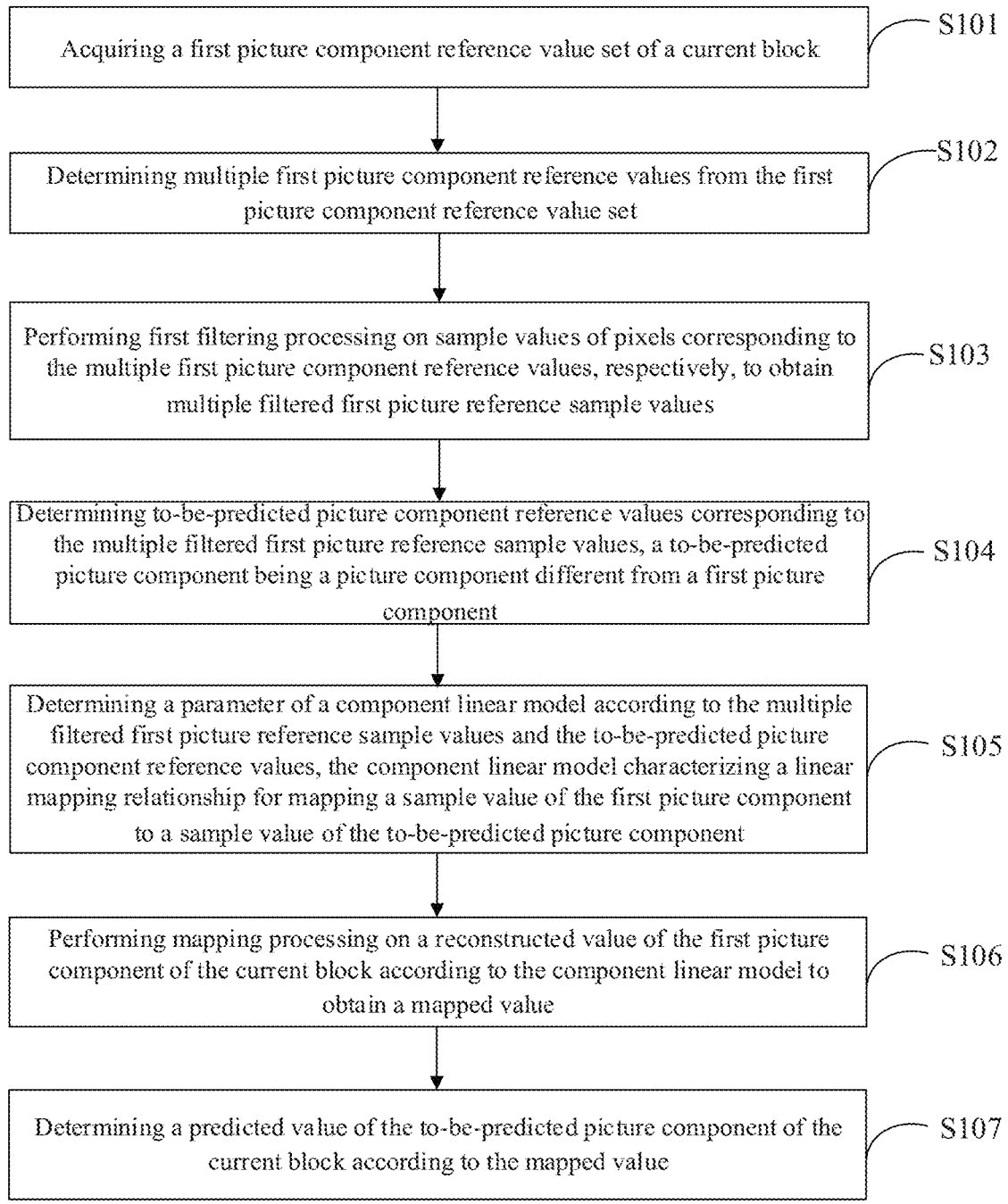
FIG. 4 is a first flowchart of a video picture component prediction method according to an embodiment of the present disclosure.

FIG. 4 is an implementation flowchart of a video picture component prediction method according to an embodiment of the present disclosure. As shown in FIG. 4, the method includes the following steps.

In S101, a first picture component reference value of a current block is acquired.

In S102, multiple first picture component reference values are determined from a first picture component reference value set.

In S103, first filtering processing is performed on sample values of samples corresponding to the multiple first picture component reference values to obtain multiple filtered first picture reference sample values respectively.

In S104, to-be-predicted picture component reference values corresponding to the multiple filtered first picture reference sample values are determined, a to-be-predicted picture component being a picture component different from a first picture component.

In S105, a parameter of a component linear model is determined according to the multiple filtered first picture reference sample values and the to-be-predicted picture component reference values, the component linear model characterizing a linear mapping relationship for mapping a sample value of the first picture component to a sample value of the to-be-predicted picture component.

In S106, mapping processing is performed on a reconstructed value of the first picture component of the current block according to the component linear model to obtain a mapped value.

In S107, a predicted value of the to-be-predicted picture component of the current block is determined according to the mapped value.

In S101, in the embodiment of the present disclosure, the current block is an encoding block or a decoding block on which picture component prediction is presently to be performed. In the embodiment of the present disclosure, a video picture component prediction device acquires the first picture component reference value of the current block. The first picture component reference value set includes one or more first picture component reference values. A reference value of the current block may be acquired from a reference block. The reference block may be an neighbouring block of the current block and may also be a non-neighbouring block of the current block. No limits are made in the embodiment of the present disclosure.

In some embodiments of the present disclosure, the video picture component prediction device determines one or more reference samples outside the current block and determines the one or more reference samples as one or more first picture component reference values.

It is to be noted that, in the embodiment of the present disclosure, an neighbouring processing block corresponding to the current block is a neighbouring processing block of one or more sides of the current block. The one or more neighbouring sides may include an neighbouring top side of the current block, may also refer to an neighbouring left side of the current block and may also refer to the neighbouring top side and left side of the current block. No specific limits are made in the embodiment of the present disclosure.

In some embodiments of the present disclosure, the video picture component prediction device determines neighbouring samples of the current block as one or more reference samples.

It is to be noted that, in the embodiment of the present disclosure, the one or more reference samples may be neighbouring samples and may also be non-neighbouring samples. No limits are made in the embodiment of the present disclosure. In the present disclosure, descriptions are made with neighbouring samples as an example.

Neighbouring samples on one or more sides corresponding to an neighbouring processing block of the current block are determined as one or more neighbouring reference samples corresponding to the current block, and each neighbouring reference sample corresponds to three picture component reference values (i.e., a first picture component reference value, a second picture component reference value and a third picture component reference value). Therefore, the video picture component prediction device may acquire the first picture component reference value in each neighbouring reference sample in the one or more neighbouring reference samples corresponding to the current block as the first picture component reference value set, and in such a manner, the one or more first picture component reference values are obtained, namely the one or more first picture component reference values represent first picture component reference values corresponding to one or more neighbouring samples in an neighbouring reference block corresponding to the current block. The first picture component in the embodiment of the present disclosure is configured to predict another picture component.

In some embodiments of the present disclosure, a combination of the first picture component and the to-be-predicted picture component includes at least one of the followings.

The first picture component is a luma component, and the to-be-predicted picture component is a first or second chroma component; or, the first picture component is the first chroma component, and the to-be-predicted picture component is the luma component or the second chroma component; or, the first picture component is the second chroma component, and the to-be-predicted picture component is the luma component or the first chroma component; or, the first picture component is a first colour component, and the to-be-predicted picture component is a second colour component or a third colour component; or, the first picture component is the second colour component, and the to-be-predicted picture component is the first colour component or the third colour component; or, the first picture component is the third colour component, and the to-be-predicted picture component is the second colour component or the first colour component.

In some embodiments of the present disclosure, the first colour component is a red component, the second colour component is a green component, and the third colour component is a blue component.

The first chroma component may be a blue chroma component, and the second chroma component may be a red chroma component. Or, the first chroma component may be the red chroma component, and the second chroma component may be the blue chroma component. Here, the first chroma component and the second chroma component represent the blue chroma component and the red chroma component respectively.

Descriptions are made with the condition that the first chroma component may be the blue chroma component and the second chroma component may be the red chroma component as an example. When the first picture component is the luma component and the to-be-predicted picture component is the first chroma component, the video picture component prediction device may predict the blue chroma component by using the luma component. When the first picture component is the luma component and the to-be-predicted picture component is the second chroma component, the video picture component prediction device may predict the red chroma component by using the luma component. When the first picture component is the first chroma component and the to-be-predicted picture component is the second chroma component, the video picture component prediction device may predict the red chroma component by using the blue chroma component. When the first picture component is the second chroma component and the to-be-predicted picture component is the first chroma component, the video picture component prediction device may predict the blue chroma component by using the red chroma component.

In S102, the video picture component prediction device may determine the multiple first picture component reference values from the one or more first picture component reference values.

In some embodiments of the present disclosure, the video picture component prediction device may compare the one or more first picture component reference values in the first picture component reference value set to determine a maximum first picture component reference value and a minimum first picture component reference value.

In some embodiments of the present disclosure, the video picture component prediction device may determine a maximum and minimum in the multiple first picture component reference values from the one or more first picture component reference values and may determine a reference value characterizing or representing the maximum or minimum first picture component reference value from the one or more first picture component reference values.

For example, the video picture component prediction device determines the maximum first picture component reference value and the minimum first picture component reference value from the first picture component reference value set.

In the embodiment of the present disclosure, the video picture component prediction device may obtain the maximum first picture component reference value and the minimum first picture component reference value in multiple manners.

A first manner: each first picture component reference value in the one or more first picture component reference values is sequentially compared to determine the maximum first picture component reference value and the minimum first picture component reference value.

A second manner: at least two first picture component reference values at preset positions are screened from the one or more first picture component reference values, the at least two first sub picture component reference values are divided to a maximum picture component reference value set and a minimum picture component reference value set according to magnitudes of numerical values, and the maximum first picture component reference value and the minimum first picture component reference value are obtained based on the maximum picture component reference value set and the minimum picture component reference value set.

That is, in the embodiment of the present disclosure, from the one or more first picture component reference values, the video picture component prediction device may select the first picture component reference value with a maximum numerical value as the maximum first picture component reference value and select the first picture component reference value with a minimum numerical value as the minimum first picture component reference value. A determination manner may be sequential pairwise comparison and may also be determination after sequencing. A specific determination manner is not limited in the embodiment of the present disclosure.

The video picture component prediction device may also select several first picture component reference values corresponding to the preset positions (preset sample positions) from sample positions corresponding to the one or more first picture component reference values as the at least two first picture component reference values, then divide a maximum data set (the maximum picture component reference value set) and a minimum data set (the minimum picture component reference value set) based on the at least two first picture component reference values and determine the maximum first picture component reference value and the minimum first picture component reference value based on the maximum data set and the minimum data set. In the process of determining the maximum first picture component reference value and the minimum first picture component reference value based on the maximum data set and the minimum data set, mean processing may be performed on the maximum data set to obtain the maximum first picture component reference value, and mean processing may be performed on the minimum data set to obtain the minimum first picture component reference value. The maximum and the minimum may also be determined in another manner. No limits are made in the embodiment of the present disclosure.

It is to be noted that the numbers of numerical values in the maximum data set and the minimum data set are integers more than or equal to 1 and the numbers of the numerical values in the two sets may be the same and may also be different. No limits are made in the embodiment of the present disclosure.

The video picture component prediction device, after determining the several first picture component reference values corresponding to the preset positions as at least two first sub picture component reference values, may also directly select a maximum from the at least two first sub picture component reference values as the maximum first picture component reference value and select a minimum as the minimum first picture component reference value.

Exemplarily, the video picture component prediction device divides M (M may be a numerical value greater than 4 and may also not be limited) maximum first sub picture component reference values in the at least two first sub picture component reference values into the maximum picture component reference value set, divides the others, except the M maximum first sub picture component reference values, in the at least two first sub picture component reference values into the minimum picture component reference value set, finally performs mean processing in the maximum picture component reference value set to obtain the maximum first picture component reference value and performs mean processing in the minimum picture component reference value set to obtain the minimum first picture component reference value.

It is to be noted that, in the embodiment of the present disclosure, the maximum first picture component reference value and the minimum first picture component reference value may be a maximum and minimum that are directly determined according to the magnitudes of the numerical values, and may also be determined in a manner of selecting first picture component reference values (the at least two first sub picture component reference values) at the preset positions capable of representing the effectiveness of the reference values, dividing the effective first picture component reference values into a set of greater numerical values and a set of smaller numerical values, determining the maximum first picture component reference value based on the set of greater numerical values and determining the minimum first picture component reference value based on the set of smaller numerical values, or directly determining the maximum first picture component reference value corresponding to the maximum and the minimum first picture component reference value corresponding to the minimum in the first picture component reference value set of which the effectiveness corresponds to the preset positions according to the magnitudes of the numerical values.

In the embodiment of the present disclosure, the manner the video picture component prediction device determines the maximum first picture component reference value and the minimum first picture component reference value is not limited. For example, the video picture component prediction device may also divide the one or more first picture component reference values into three or even four sets according to the magnitudes, process each set to obtain a representative parameter and then select maximum and minimum parameters from the representative parameters as the maximum first picture component reference value and the minimum first picture component reference value.

In the embodiment of the present disclosure, positions capable of representing the effectiveness of first picture component reference values may be selected as the preset positions. The number of the preset positions is not limited, and for example, may be 4 and 6. The preset positions may also be all positions of the neighbouring samples. No limits are made in the embodiment of the present disclosure.

Exemplarily, the preset positions may also be a preset number of first picture component reference values selected from a center of a corresponding row or column as a basis to two sides according to a sampling frequency, and may also be first picture component reference values at other positions, except edge point positions, of the corresponding row or column. No limits are made in the embodiment of the present disclosure.

Distribution of the preset positions in the row and the column may be uniform distribution and may also be distribution according to a preset manner. No limits are made in the embodiment of the present disclosure. For example, when the number of the preset positions is 4 and there are positions corresponding to one or more first picture component reference values in an neighbouring row and an neighbouring column, two first picture component reference values are selected from the first picture component reference values corresponding to the neighbouring row and two first picture component reference values are selected from the first picture component reference values corresponding to the neighbouring column, or one first picture component reference value is selected from the first picture component reference values corresponding to the neighbouring row and three first picture component reference values are selected from the first picture component reference values corresponding to the neighbouring column. No limits are made in the embodiment of the present disclosure.

The video picture component prediction device may determine the maximum and minimum in the one or more first picture component reference values from the one or more first picture component reference values, namely the maximum in the one or more first picture component reference values, i.e., the maximum first picture component reference value, and the minimum in the one or more first picture component reference values, i.e., the minimum first picture component reference value, are obtained. Or, after multiple reference values are determined from the preset positions in the one or more first picture component reference values, the maximum first picture component reference value representing the maximum and the minimum first picture component reference value representing the minimum are obtained by processing. Here, for ensuring that sampling positions are the same as or close to those of another video component, it is necessary to perform filtering based on the sample positions corresponding to the maximum first picture component reference value and the minimum first picture component reference value and then perform subsequent processing.

In S103, the video picture component prediction device performs first filtering processing on the sample values of the samples corresponding to the determined multiple first picture component reference values to obtain the multiple filtered first picture reference sample values respectively.

In the embodiment of the present disclosure, the multiple filtered first picture reference sample values may be a filtered maximum first picture component reference value and a filtered minimum first picture component reference value, and may also be multiple other reference sample values including the first picture component reference value and the filtered minimum first picture component reference value or multiple other reference sample values. No limits are made in the embodiment of the present disclosure.

In the embodiment of the present disclosure, the video picture component prediction device may filter the sample positions (i.e., the sample values of the corresponding samples) corresponding to the determined first picture component reference values to obtain the corresponding multiple filtered first picture reference sample values, and then the component linear model may subsequently be constructed based on the multiple filtered first picture reference sample values.

In some embodiments of the present disclosure, the video picture component prediction device performs first filtering processing on sample values of samples corresponding to the maximum first picture component reference value and the minimum first picture component reference value to obtain the filtered maximum first picture component reference value and the filtered minimum first picture component reference value respectively.

It is to be noted that, since the determined multiple first picture component reference values may be the maximum first picture component reference value and the minimum first picture component reference value, in a filtering process, filtering (i.e., first filtering processing) may be performed on the sample positions (i.e., the sample values of the corresponding samples) configured to determine the maximum first picture component reference value and the minimum first picture component reference value to obtain the corresponding filtered maximum first picture component reference value and filtered minimum picture component reference value (i.e., the multiple filtered first picture reference sample values), and then the component linear model may subsequently be constructed based on the filtered maximum first picture component reference value and the filtered minimum first picture component reference value.

In the embodiment of the present disclosure, a filtering manner may be up-sampling, down-sampling, low-pass filtering and other manners. No limits are made in the embodiment of the present disclosure. The down-sampling manner may include mean, interpolation or median, etc. No limits are made in the embodiment of the present disclosure.

In the embodiment of the present disclosure, first filtering processing may be down-sampling filtering and low-pass filtering.

Exemplarily, the video picture component prediction device performs down-sampling filtering on the sample positions configured to determine the maximum first picture component reference value and the minimum first picture component reference value, thereby obtaining the corresponding filtered maximum first picture component reference value and filtered minimum first picture component reference value.

The following descriptions are made with the mean down-sampling manner.

The video picture component prediction device performs mean calculation of the first picture component for a region consisting of the corresponding position configured to determine the maximum first picture component reference value and neighbouring sample positions thereof, namely samples of the region are integrated into a sample, and a mean result is a first picture component reference value corresponding, to the integrated sample, i.e., the filtered maximum first picture component reference value. Similarly, the video picture component prediction device performs mean calculation of the first picture component for a region consisting of the position corresponding to the minimum first picture component reference value and neighbouring sample positions thereof, namely samples of the region are integrated into a sample, and a mean result is a first picture component reference value corresponding to the integrated sample, i.e., the filtered minimum first picture component reference value.

It is to be noted that, in the embodiment of the present disclosure, down-sampling processing of the video picture component prediction device is implemented by a filter and determination of a specific range of the neighbouring vector sample positions of the position corresponding to the maximum first picture component reference value may be determined by a type of the filter. No limits are made in the embodiment of the present disclosure.

In the embodiment of the present disclosure, the type of the filter may be a 6-tap filter and may also be a 4-tap filter. No limits are made in the embodiment of the present disclosure.

In S104 and S105, the video picture component prediction device determines the to-be-predicted picture component reference values corresponding to the multiple filtered first picture reference sample values, the to-be-predicted picture component being a picture component (for example, a second picture component or a third picture component) different from the first picture component, and then determines the parameter of the component linear model according to the multiple filtered first picture reference sample values and the to-be-predicted picture component reference values, the component linear model characterizing the linear mapping relationship for mapping the sample value of the first picture component to the sample value of the to-be-predicted picture component, for example, a functional relationship.

In some embodiments of the present disclosure, the video picture component prediction device determines a maximum to-be-predicted picture component reference value corresponding to the filtered maximum first picture component reference value and a minimum to-be-predicted picture component reference value corresponding to the filtered minimum first picture component reference value.

It is to be noted that, in the embodiment of the present disclosure, the video picture component prediction device may deduce a model parameter (i.e., the parameter of the component linear model) in a maximum and minimum-based construction manner according to the principle that "two points determine a line" and further construct the component linear model, i.e., a simplified CCLM.

In the embodiment of the present disclosure, the video picture component prediction device performs down-sampling (i.e., filtering) and implements alignment with positions of the to-be-predicted picture. In such a manner, the to-be-predicted picture component reference values corresponding to the filtered first picture component reference sample values may be determined. For example, the maximum to-be-predicted picture component reference value corresponding to the filtered maximum first picture component reference value and the minimum to-be-predicted picture component reference value corresponding to the filtered minimum first picture component reference value are determined. In such case, since two points (filtered maximum first picture component reference value, maximum to-be-predicted picture component reference value) and (filtered minimum first picture component reference value, minimum to-be-predicted picture component reference value) have been determined, the video picture component prediction device may deduce the model parameter according to the principle that "two points determine a line" and further construct the component linear model.

In some embodiments of the present disclosure, the video picture component prediction device determines the parameter of the component linear model according to the filtered maximum first picture component reference value, the maximum to-be-predicted picture component reference value, the filtered minimum first picture component reference value and the minimum to-be-predicted picture component reference value, the component linear model characterizing the linear mapping relationship for mapping the sample value of the first picture component to the sample value of the to-be-predicted picture component.

In some embodiments of the present disclosure, an implementation mode of the operation that the video picture component prediction device determines the parameter of the component linear model according to the filtered maximum first picture component reference value, the maximum to-be-predicted picture component reference value, the filtered minimum first picture component reference value and the minimum to-be-predicted picture component reference value may include the following contents. (1) The parameter of the component linear model also includes a multiplicative factor and an additive offset. In such case, the video picture component prediction device may calculate a first different value between the maximum to-be-predicted picture component reference value and the minimum to-be-predicted picture component reference value, calculate a second difference value between the maximum first picture component reference value and the minimum first picture component reference value, set the multiplicative factor to be a ratio of the first difference value to the second difference value, calculate a first product between the maximum first picture component reference value and the multiplicative factor and set the additive offset to be a difference value between the maximum to-be-predicted picture component reference value and the first product, or calculate a second product between the minimum first picture component reference value and the multiplicative factor and set the additive offset to be a difference value between the minimum to-be-predicted picture component reference value and the second product. (2) A first sub component linear model is constructed by using the filtered maximum first picture component reference value, the maximum to-be-predicted picture component reference value and a preset initial linear model, a second sub component linear model is constructed by using the filtered minimum first picture component reference value, the minimum to-be-predicted picture component reference value and the preset initial linear model, a model parameter is obtained based on the first sub component linear model and the second sub component linear model, and the component linear model is constructed by using the model parameter and the preset initial linear model.

Setting of the above numerical values is determined or designed according to a practical condition. No limits are made in the embodiment of the present disclosure.

Exemplarily, the component linear model represents the linear mapping relationship between the first picture component and the to-be-predicted picture component, so that the video picture component prediction device may predict the to-be-predicted picture component based on the first picture component and the component linear model. In the embodiment of the present disclosure, the to-be-predicted picture component may be a chroma component.

Exemplarily, the component linear model may be shown as the following formula (1):

$$C = \alpha Y + \beta \qquad (1).$$

Y represents a reconstructed value of the first picture component corresponding to a certain sample in the current block (down-sampled), C represents a predicted value of the second picture component corresponding to the sample in the current block, and $\alpha$ and $\beta$ are model parameters of the component linear model.

Specific implementation of the model parameters will be described in a subsequent embodiment in detail.

It can be understood that the video picture component prediction device may select the maximum and minimum first picture component reference values at first based on the directly acquired one or more first picture component reference values corresponding to the current block, then perform down-sampling according to the positions corresponding to the selected maximum first picture component reference value and minimum first picture component reference value and further construct the component linear model. In such a manner, the workload of performing down-sampling processing on the samples corresponding to the current block is reduced, namely filtering operations are reduced, so that the complexity in construction of the component linear model is reduced, the complexity in video component prediction is further reduced, the prediction efficiency is improved, and the video coding and decoding efficiency is improved.

In S106 and S107, in the embodiment of the present disclosure, the video picture component prediction device, after obtaining the component model parameter, may directly perform video component prediction on the current block by using the component linear model and further obtain the predicted value of the to-be-predicted picture component. The video picture component prediction device may perform mapping processing on the reconstructed value of the first picture component of the current block according to the component linear model to obtain the mapped value and then determine the predicted value of the to-be-predicted picture component of the current block according to the mapped value.

In some embodiments of the present disclosure, the video picture component prediction device performs second filtering processing on the reconstructed value of the first picture component to obtain a second filtered value of the reconstructed value of the first picture component and performs mapping processing on the second filtered value according to the component linear model to obtain the mapped value.

In some embodiments of the present disclosure, the video picture component prediction device sets the mapped value as the predicted value of the to-be-predicted picture component of the current block.

Second filtering processing may be down-sampling filtering or low-pass filtering.

In some embodiments of the present disclosure, the video picture component prediction device may also perform third filtering processing on the mapped value to obtain a third filtered value of the mapped value and set the third filtered value as the predicted value of the to-be-predicted picture component of the current block.

Third filtering processing may be low-pass filtering.

In the embodiment of the present disclosure, the predicted value represents predicted values of the second picture components or predicted values of third picture components corresponding to one or more samples of the current block.

It can be understood that, in the construction process of the component linear model, the multiple first picture component reference values are selected at first, then filtering processing is performed according to the positions corresponding to the selected multiple first picture component reference values, and the component linear model is further constructed. In such a manner, the workload of performing filtering processing on the samples corresponding to the current block is reduced, namely filtering operations are reduced, so that the complexity in construction of the component linear model is reduced, the complexity in video component prediction is further reduced, the prediction efficiency is improved, and the video coding and decoding efficiency is improved.

Figure 5:
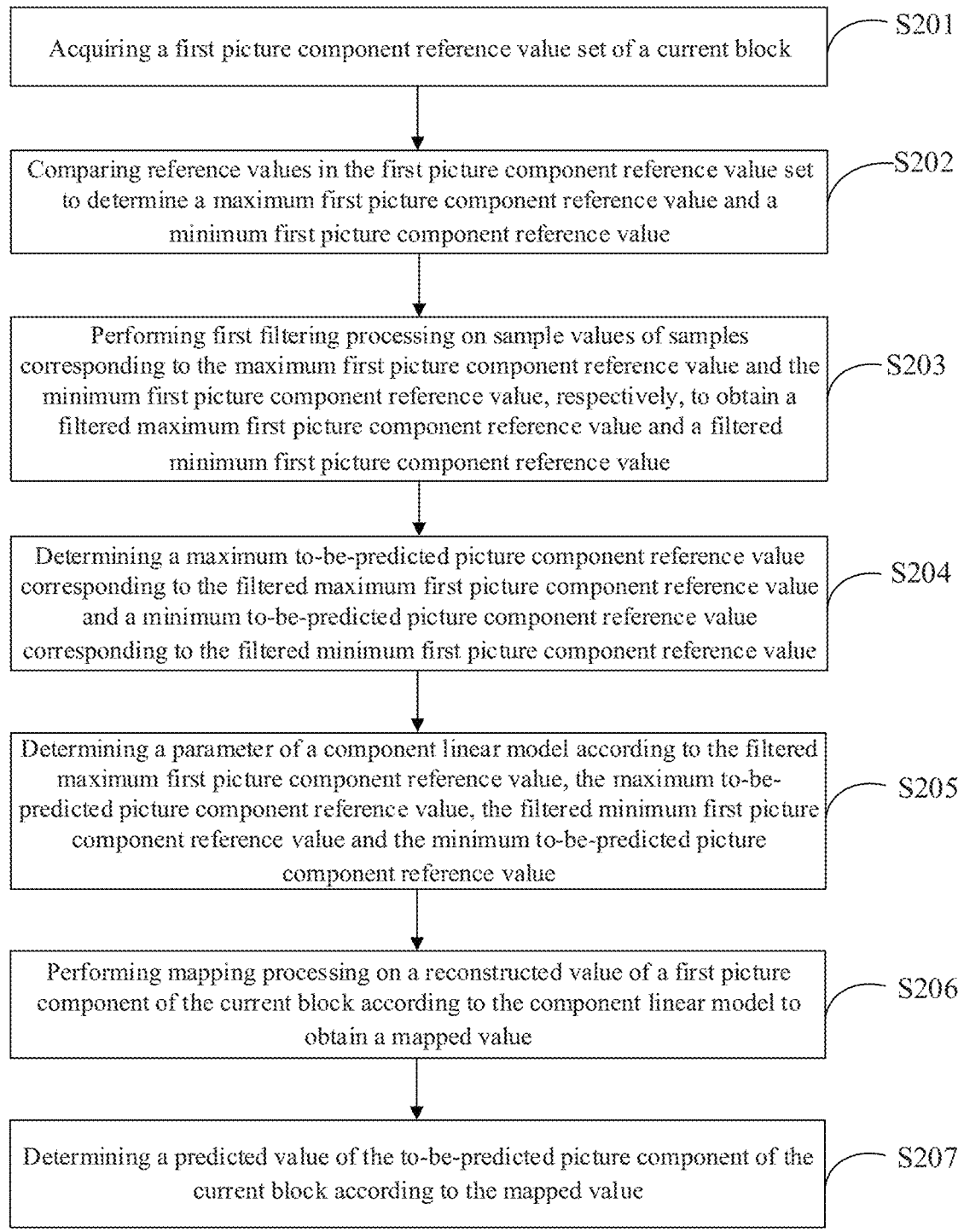
FIG. 5 is a second flowchart of a video picture component prediction method according to an embodiment of the present disclosure.

In some embodiments, as shown in FIG. 5, an embodiment of the present disclosure also provides a video picture component prediction method, which includes the following steps.

In S201, a first picture component reference value set of a current block is acquired.

In S202, reference values in the first picture component reference value set are compared to determine a maximum first picture component reference value and a minimum first picture component reference value.

In S203, first filtering processing is performed on sample values of samples corresponding to the maximum first picture component reference value and the minimum first picture component reference value, respectively, to obtain a filtered maximum first picture component reference value and a filtered minimum first picture component reference value.

In S204, a maximum to-be-predicted picture component reference value corresponding to the filtered maximum first picture component reference value and a minimum to-be-predicted picture component reference value corresponding to the filtered minimum first picture component reference value are determined.

In S205, a parameter of a component linear model is determined according to the filtered maximum first picture component reference value, the maximum to-be-predicted picture component reference value, the filtered minimum first picture component reference value and the minimum to-be-predicted picture component reference value, the component linear model representing a linear mapping relationship for mapping a sample value of a first picture component to a sample value of a to-be-predicted picture component.

In S206, mapping processing is performed on a reconstructed value of the first picture component of the current block according to the component linear model to obtain a mapped value.

In S207, a predicted value of the to-be-predicted picture component of the current block is determined according to the mapped value.

In the embodiment of the present disclosure, the process of S201 to S207 have been described in the abovementioned embodiment and will not be elaborated herein.

It is to be noted that, when a video picture component prediction device performs prediction, for the reconstructed value of the first picture component of the current block, first picture component filtering is performed on the current block to obtain the reconstructed value of the first picture component corresponding to the current block, and then the predicted value of the to-be-predicted picture component of the current block is obtained according to the component linear model and the reconstructed value of the first picture component.

In the embodiment of the present disclosure, after the video picture component prediction device obtains the component linear model, since a minimum unit for prediction of the current block is required to be sample, a reconstructed value of the first picture component corresponding to each sample of the current block is required to predict a predicted value of the to-be-predicted picture component corresponding to the sample. Here, the video picture component prediction device performs first picture component filtering (for example, down-sampling) on the current block at first to obtain the reconstructed value of the first picture component corresponding to the current block, specifically obtaining the reconstructed value of the first picture component of each sample corresponding to the current block.

In the embodiment of the present disclosure, the constructed value of the first picture component represents the reconstructed values of the first picture components corresponding to one or more samples of the current block.

Then, the video picture component prediction device may perform mapping processing on the reconstructed value of the first picture component of the current block based on the component linear model to obtain the mapped value and obtain the predicted value of the to-be-predicted picture component of the current block according to the mapped value.

Figure 6:
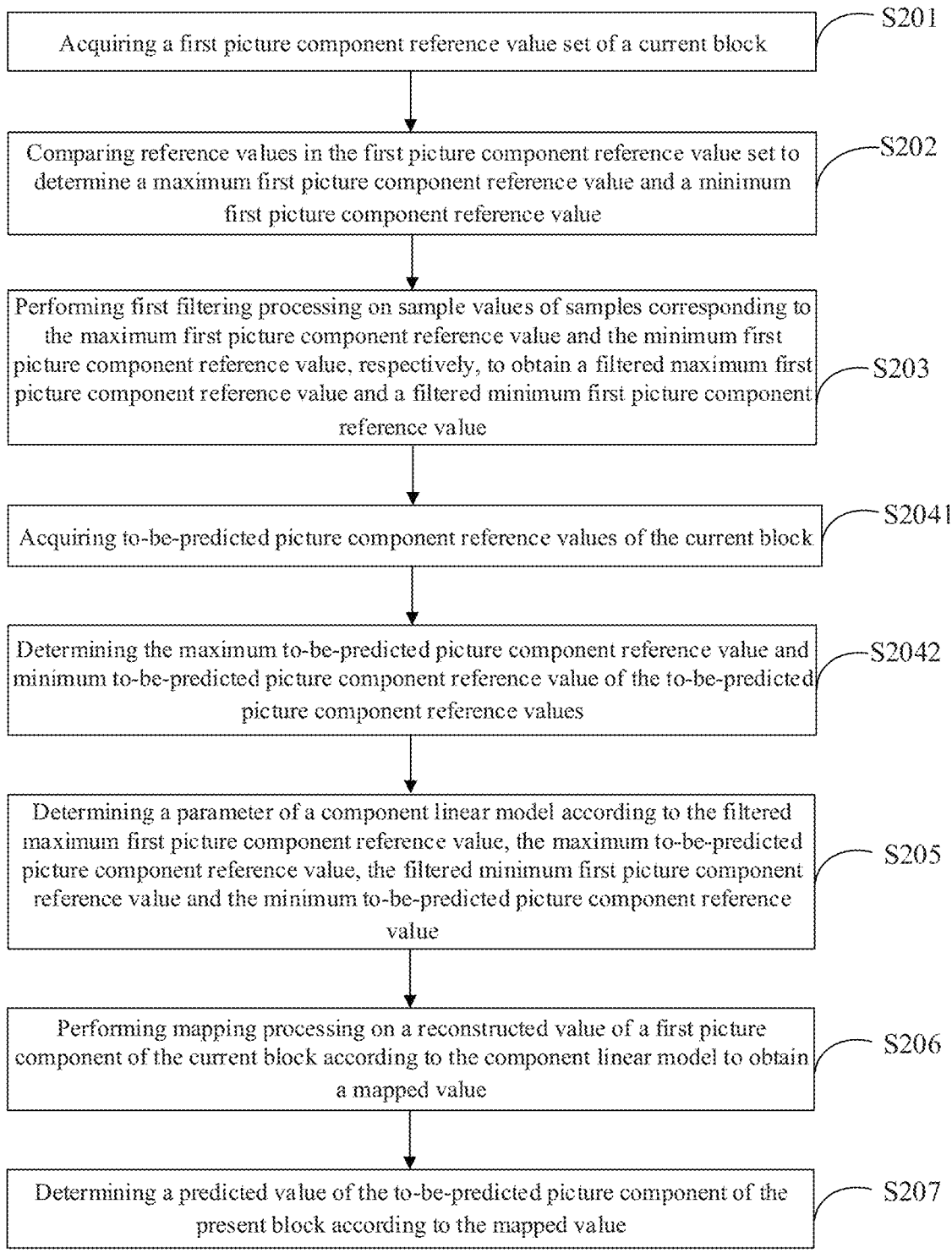
FIG. 6 is a third flowchart of a video picture component prediction method according to an embodiment of the present disclosure.

In some embodiments of the present disclosure, as shown in FIG. 6, specific implementation of S204 may include S2041 to S2042, as follows.

In S2041, to-be-predicted picture component reference values of the current block is acquired.

In S2042, the maximum to-be-predicted picture component reference value and minimum to-be-predicted picture component reference value of the to-be-predicted picture component reference values are determined.

In the embodiment of the present disclosure the process that the video picture component prediction device constructs the component linear model based on the filtered maximum picture component reference value and the filtered minimum picture component reference value is based on the principle that "two points determine a line". Under the condition that the first picture component is the abscissa and the to-be-predicted picture component is the ordinate, numerical values of abscissas of two points are known, and it is also necessary to determine numerical values of ordinates corresponding to the two points to determine a linear model, i.e., the component linear model, according to the principle that "two points determine a line".

In some embodiments of the present disclosure, the video picture component prediction device converts a first picture component reference value sample position corresponding to the maximum first picture component reference value into a first sample position, sets the maximum to-be-predicted picture component reference value to be a reference value at the first sample position in the to-be-predicted picture component reference values, converts a first picture component reference value sample point corresponding to the minimum first picture component reference value into a second sample position and sets the minimum to-be-predicted picture component reference value to be a reference value at the second sample position in the to-be-predicted picture component reference values.

Exemplarily, descriptions are made with the condition that reference samples are neighbouring samples as an example. The video picture component prediction device may acquire one or more to-be-predicted picture component reference values corresponding to the current block based on the above descriptions about the neighbouring block. Here, the one or more to-be-predicted picture component reference values may refer to that a reference value of the to-be-predicted picture component in each neighbouring reference sample in one or more reference samples corresponding to the current block is determined as a to-be-predicted picture component reference value, so that the video picture component prediction device obtains the one or more to-be-predicted picture component reference values.

The video picture component prediction device finds a first neighbouring reference sample corresponding to the filtered maximum first picture component reference value from the samples corresponding to the one or more to-be-predicted picture component reference values, determines the to-be-predicted picture component reference value corresponding to the first neighbouring reference sample as the maximum to-be-predicted picture component reference value, namely determining the maximum to-be-predicted picture component reference value corresponding to the filtered maximum first picture component reference value, finds a second neighbouring reference sample corresponding to the filtered minimum first picture component reference value from the samples corresponding to the one or more to-be-predicted picture component reference values and determines the to-be-predicted picture component reference value corresponding to the second neighbouring reference sample as the minimum to-be-predicted picture component reference value, namely determining the minimum to-be-predicted picture component reference value corresponding to the filtered minimum first picture component reference value. Finally, a straight line is determined according to the principle that "two points determine a line" and based on the two points (filtered maximum first picture component reference value, maximum to-be-predicted picture component reference value) and (filtered minimum first picture component reference value, minimum to-be-predicted picture component reference value). A function (mapping relationship) represented by the straight line is the component linear model.

In some embodiments of the present disclosure, the video picture component prediction device may also filter neighbouring sample positions at first to obtain one or more to-be-predicted is picture component reference values of the filtered samples, then find the first neighbouring reference sample corresponding to the filtered maximum first picture component reference value from the filtered sample positions, determine the to-be-predicted picture component reference value (one of the one or more to-be-predicted picture component reference values) corresponding to the first neighbouring reference sample as the maximum to-be-predicted picture component reference value, namely determining the maximum to-be-predicted picture component reference value corresponding to the filtered maximum first picture component reference value, find the second neighbouring reference sample corresponding to the filtered minimum first picture component reference value from the filtered sample positions and determine the to-be-predicted picture component reference value corresponding to the second neighbouring reference sample as the minimum to-be-predicted picture component reference value, namely determining the minimum to-be-predicted picture component reference value corresponding to the filtered minimum first picture component reference value.

It is to be noted that the process that the video picture component prediction device may also filter the neighbouring sample positions at first is filtering for the to-be-predicted picture component, for example, the chroma picture component, and no limits are made in the embodiment of the present disclosure. That is, in the embodiment of the present disclosure, the video picture component prediction device may perform fourth filtering processing on the to-be-predicted picture component reference value to obtain a reconstructed value of the to-be-predicted picture component.

Fourth filtering processing may be low-pass filtering.

In some embodiments of the present disclosure, the video picture component prediction device constructs the component linear model through the following process: a first sub component linear model is constructed by using the filtered maximum first picture component reference value, the maximum to-be-predicted picture component reference value and a preset initial linear model, a second sub component linear model is constructed by using the filtered minimum first picture component reference value, the minimum to-be-predicted picture component reference value and the preset initial linear model, a model parameter is obtained based on the first sub component linear model and the second sub component linear model, and the component linear model is constructed by using the model parameter and the preset initial linear model.

In the embodiment of the present disclosure, the preset initial linear model is an initial model of which a model parameter is unknown.

Exemplarily, the preset initial linear model may be in form of the formula (1) but α and β therein are unknown. A second equation in two unknowns is constructed by using the first sub component linear model and the second sub component linear model, the model parameters α and β may be obtained, and α and β may be substituted into the formula (1) to obtain the linear mapping relationship model of the first picture component and the to-be-predicted picture component.

Exemplarily, the maximum first picture component reference value (the filtered maximum first picture component reference value) and the minimum first picture component reference value (the filtered minimum first picture component reference value) are searched to deduce the model parameters α and β shown in the following formula (2) according to the principle that "two points determine a line":

$$\begin{cases} \alpha = \frac{L_{max} - L_{min}}{C_{max} - C_{min}} \\ \beta = L_{min} - \alpha \cdot C_{min} \end{cases} \quad (2)$$

Figure 7:
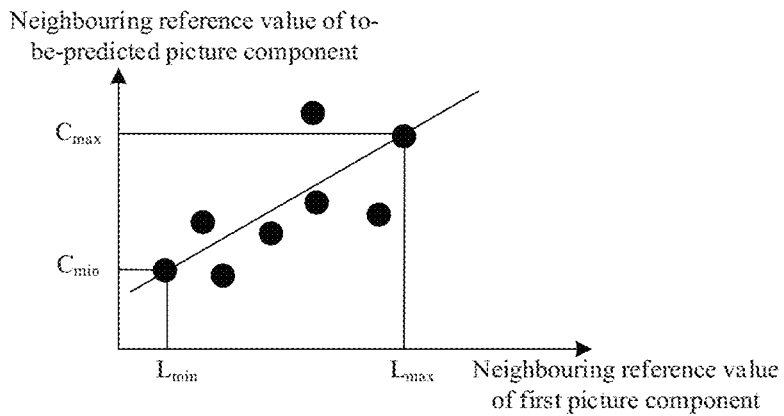
FIG. 7 is a structure diagram of constructing a prediction model based on maximums and minimums according to an embodiment of the present disclosure.

$L_{max}$ and $L_{min}$ represent a maximum and minimum obtained by searching first picture component reference values corresponding to a left side and/or a top side that are/is not down-sampled, and $C_{max}$ and $C_{min}$ represent to-be-predicted picture component reference values corresponding to neighbouring reference samples at positions corresponding to $L_{max}$ and $L_{min}$. Referring to FIG. 7, a structure diagram of constructing a prediction model based on maximums and minimums of a current block is shown. The abscissa represents the first picture component reference value of the current block, and the ordinate represents the to-be-predicted picture component reference value of the current block. The model parameters α and β may be calculated through the formula (2) according to $C_{max}$, $C_{min}$, $L_{max}$ and $L_{min}$, and a constructed prediction model is C=αY+β. In a practical prediction process, L represents a reconstructed value of the first picture component corresponding to a sample in the current block, and C represents a predicted value of the to-be-predicted picture component corresponding to the sample in the current block.

It can be understood that the video picture component prediction device may select the maximum and minimum first picture component reference values at first based on the directly acquired one or more first picture component reference values corresponding to the current block, then perform down-sampling (filtering) according to the positions corresponding to the selected maximum first picture component reference value and minimum first picture component reference value and further construct the component linear model. In such a manner, the workload of performing down-sampling processing on the samples corresponding to the current block is reduced, namely filtering operations are reduced, so that the complexity in construction of the component linear model is reduced, the complexity in video component prediction is further reduced, the prediction efficiency is improved, and the video coding and decoding efficiency is improved.

Based on the abovementioned embodiments, the embodiments of the present disclosure provide a video component prediction device. Each unit of the device and each module of each unit may be implemented through a processor in the video component prediction device and, of course, may also be implemented through a specific logic circuit. In an implementation process, the processor may be a central processing unit, a micro processing unit, a Digital Signal Processor (DSP), a field-programmable gate array or the like.

Figure 8:
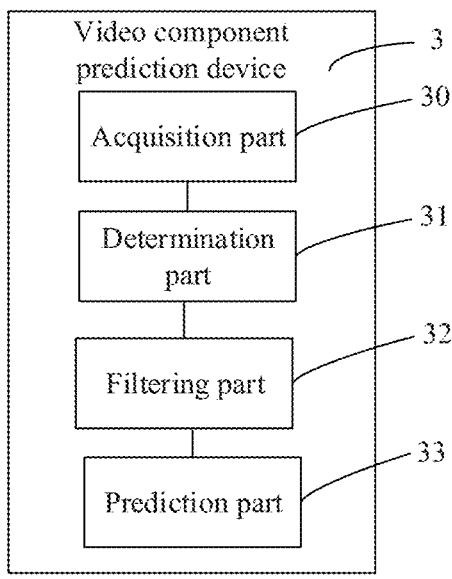
FIG. 8 is a first structure diagram of a video picture component prediction device according to an embodiment of the present disclosure.

As shown in FIG. 8, the embodiments of the present disclosure provide a video component prediction device 3, which includes an acquisition part 30, a determination part 31, a filtering part 32 and a prediction part 33.

The acquisition part 30 is configured to acquire a first picture component reference value set of a current block. The first picture component reference value set includes one or more first picture component reference values.

The determination part 31 is configured to determine multiple first picture component reference values from the first picture component reference value set.

The filtering part 32 is configured to perform first filtering processing on sample values of samples corresponding to the multiple first picture component reference values, respectively, to obtain multiple filtered first picture reference sample values.

The determination part 31 is further configured to determine to-be-predicted picture component reference values corresponding to the multiple filtered first picture reference sample values, a to-be-predicted picture component being a picture component different from a first picture component, and determine a parameter of a component linear model according to the multiple filtered first picture reference sample values and the to-be-predicted picture component reference values, the component linear model characterizing a linear mapping relationship for mapping a sample value of the first picture component to a sample value of the to-be-predicted picture component.

The filtering part 32 is further configured to perform mapping processing on a reconstructed value of the first picture component of the current block according to the component linear model to obtain a mapped value.

The prediction part 33 is configured to determine a predicted value of the to-be-predicted picture component of the current block according to the mapped value.

In some embodiments of the present disclosure, the determination part 31 is further configured to compare the reference values in the first picture component reference value set to determine a maximum first picture component reference value and a minimum first picture component reference value.

In some embodiments of the present disclosure, the filtering part 32 is further configured to perform first filtering processing on the sample values of the samples corresponding to the maximum first picture component reference value and the minimum first picture component reference value, respectively, to obtain a filtered maximum first picture component reference value and a filtered minimum first picture component reference value.

In some embodiments of the present disclosure, the determination part 31 is further configured to determine a maximum to-be-predicted picture component reference value corresponding to the filtered maximum first picture component reference value and a minimum to-be-predicted picture component reference value corresponding to the filtered minimum first picture component reference value.

In some embodiments of the present disclosure, the determination part 31 is further configured to determine the parameter of the component linear model according to the filtered maximum first picture component reference value, the maximum to-be-predicted picture component reference value, the filtered minimum first picture component reference value and the minimum to-be-predicted picture component reference value, the component linear model characterizing the linear mapping relationship for mapping the sample value of the first picture component to the sample value of the to-be-predicted picture component.

In some embodiments of the present disclosure, the determination part 31 is further configured to determine one or more reference samples outside the current block.

The acquisition part 30 is further configured to determine the one or more reference samples as the one or more first picture component reference values.

In some embodiments of the present disclosure, the determination part 31 is further configured to determine neighboring samples of the current block as the one or more reference samples.

In some embodiments of the present disclosure, the filtering part 32 is further configured to perform second filtering processing on the reconstructed value of the first picture component to obtain a second filtered value of the reconstructed value of the first picture component and perform mapping processing on the second filtered value according to the component linear model to obtain the mapped value.

In some embodiments of the present disclosure, second filtering processing is down-sampling filtering or low-pass filtering.

In some embodiments of the present disclosure, the prediction part 33 is further configured to set the mapped value as the predicted value of the to-be-predicted picture component of the current block.

In some embodiments of the present disclosure, the filtering part 32 is further configured to perform third filtering processing on the mapped value to obtain a third filtered value of the mapped value.

The prediction part 33 is further configured to set the third filtered value as the predicted value of the to-be-predicted picture component of the current block.

In some embodiments of the present disclosure, third filtering processing is low-pass filtering.

In some embodiments of the present disclosure, the determination part 31 is further configured to determine to-be-predicted picture component reference values of the current block and determine the maximum to-be-predicted picture component reference value and minimum to-be-predicted picture component reference value of the to-be-predicted picture component reference values.

In some embodiments of the present disclosure, the filtering part 32 is further configured to perform fourth filtering processing on the to-be-predicted picture component reference value to obtain a reconstructed value of the to-be-predicted picture component.

In some embodiments of the present disclosure, fourth filtering processing is low-pass filtering.

In some embodiments of the present disclosure, the determination part 31 is further configured to convert a first picture component reference value sample position corresponding to the maximum first picture component reference value into a first sample position, set the maximum to-be-predicted picture component reference value to be a reference value of the to-be-predicted picture component reference values which is at the first sample position, convert a first picture component reference value sample point corresponding to the minimum first picture component reference value into a second sample position and set the minimum to-be-predicted picture component reference value to be a reference value of the to-be-predicted picture component reference values which is at the second sample position.

In some embodiments of the present disclosure, the determination part 31 is further configured to construct a first sub component linear model by using the filtered maximum first picture component reference value, the maximum to-be-predicted picture component reference value and a preset initial linear model, construct a second sub component linear model by using the filtered minimum first picture component reference value, the minimum to-be-predicted picture component reference value and the preset initial linear model, obtain a model parameter based on the first sub component linear model and the second sub component linear model and construct the component linear model by using the model parameter and the preset initial linear model.

In some embodiments of the present disclosure, the determination part 31 is further configured to determine that the parameter of the component linear model includes a multiplicative factor and an additive offset, calculate a first different value between the maximum to-be-predicted picture component reference value and the minimum to-be-predicted picture component reference value, calculate a second difference value between the maximum first picture component reference value and the minimum first picture component reference value, set the multiplicative factor to be a ratio of the first difference value to the second difference value, calculate a first product between the maximum first picture component reference value and the multiplicative factor and set the additive offset to be a difference value between the maximum to-be-predicted picture component reference value and the first product, or calculate a second product between the minimum first picture component reference value and the multiplicative factor and set the additive offset to be a difference value between the minimum to-be-predicted picture component reference value and the second product.

In some embodiments of the present disclosure, the first picture component is a luma component, and the to-be-predicted picture component is a first or second chroma component; or, the first picture component is the first chroma component, and the to-be-predicted picture component is the luma component or the second chroma component; or, the first picture component is the second chroma component, and the to-be-predicted picture component is the luma component or the first chroma component; or, the first picture component is a first colour component, and the to-be-predicted picture component is a second colour component or a third colour component; or, the first picture component is the second colour component, and the to-be-predicted picture component is the first colour component or the third colour component; or, the first picture component is the third colour component, and the to-be-predicted picture component is the second colour component or the first colour component.

In some embodiments of the present disclosure, the first colour component is a red component, the second colour component is a green component, and the third colour component is a blue component.

In some embodiments of the present disclosure, first filtering processing is down-sampling filtering or low-pass filtering.

It is to be noted that, in the embodiments of the present disclosure, when implemented in form of a software function module and sold or used as an independent product, the video component prediction method may also be stored in a computer-readable storage medium. Based on such an understanding, the technical solutions of the embodiments of the present disclosure substantially or parts making contributions to the related art may be embodied in form of a software product. The computer software product is stored in a storage medium, including a plurality of instructions configured to enable an electronic device (which may be a mobile phone, a tablet computer, a personal computer, a personal digital assistant, a navigator, a digital phone, a video phone, a television, a sensing device, a server or the like) to execute all or part of the method as described in each embodiment of the present disclosure. The storage medium includes various media capable of storing program codes such as a U disk, a mobile hard disk, a Read Only Memory (ROM), a magnetic disk or an optical disk. Therefore, the embodiments of the present disclosure are not limited to any specific hardware and software combination.

Figure 9:
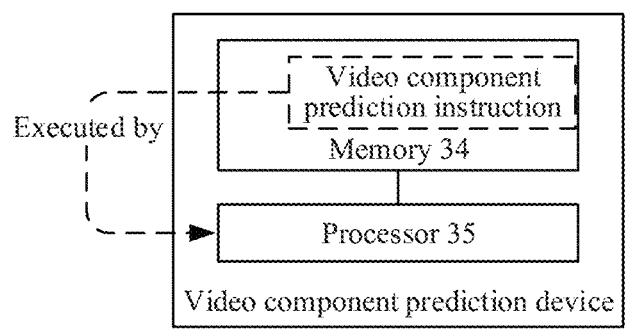
FIG. 9 is a second structure diagram of a video picture component prediction device according to an embodiment of the present disclosure.

During a practical application, as shown in FIG. 9, an embodiment of the present disclosure provides a video component prediction device, which includes a memory 34 and a processor 35.

The memory 34 is configured to store an executable video component prediction instruction.

The processor 35 is configured to execute the executable video component prediction instruction stored in the memory 34 to implement the steps of a video component prediction method provided in the abovementioned embodiments.

Correspondingly, the embodiment of the present disclosure provides a computer-readable storage medium, in which a video component prediction instruction is stored. The video component prediction instruction is executed by the processor 35 to implement the steps in a video component prediction method provided in the abovementioned embodiments.

It is to be pointed out here that the above descriptions about the storage medium and device embodiment are similar to the descriptions about the method embodiment and beneficial effects similar to those of the method embodiment are achieved. Technical details undisclosed in the storage medium and device embodiment of the present disclosure are understood with reference to the descriptions about the method embodiment of the present disclosure.

The above is only the implementation mode of the present disclosure and not intended to limit the scope of protection of the present disclosure. Any variations or replacements apparent to those skilled in the art within the technical scope disclosed by the present disclosure shall fall within the scope of protection of the present disclosure. Therefore, the scope of protection of the present disclosure shall be subject to the scope of protection of the claims.

INDUSTRIAL APPLICABILITY

In the embodiments of the application, a video picture component prediction device may determine multiple first picture component reference values at first based on directly acquired first picture component reference values corresponding to a current block, then perform filtering processing according to positions corresponding to the determined

The invention claimed is:

1. A picture component prediction method, applied to a decoder, the method comprising:
   determining a first picture component reference value set of a current block;
   determining multiple first picture component reference values according to the first picture component reference value set, wherein the multiple first picture component reference values include four reference values corresponding to four preset sample positions, respectively;
   performing first filtering processing on sample values of samples corresponding to the multiple first picture component reference values, respectively, to determine multiple filtered first picture reference sample values, wherein the first filtering processing is performed on the sample values of the samples corresponding to the multiple first picture component reference values to obtain a filtered reference value set, and wherein reference sample values in the filtered reference value set are compared, and wherein a set of greater first picture component reference values and a set of smaller first picture component reference values are determined based on the reference sample values, wherein the multiple filtered first picture reference sample values are determined by using multiple values from each of the set of greater first picture component reference values and the set of smaller first picture component reference values;
   determining a parameter of a component linear model according to the multiple filtered first picture reference sample values and a corresponding to-be-predicted picture component reference values, the to-be-predicted picture component being a picture component which is different from the first picture component, and the component linear model characterizing a linear mapping relationship for mapping a sample value of the first picture component to a sample value of the to-be-predicted picture component;
   performing mapping processing on a reconstructed value of the first picture component of the current block according to the component linear model to obtain a mapped value; and
   determining a predicted value of the to-be-predicted picture component of the current block according to the mapped value.

2. The method of claim 1, wherein determining the first picture component reference value set of a current block comprises:
   determining one or more reference samples that locate outside of the current block, and determining the one or more reference samples as the first picture component reference value set,
   wherein determining the one or more reference samples that locate outside of the current block comprises:
   determining neighboring samples of the current block as one or more reference samples.

3. The method of claim 2, wherein the neighboring samples of the current block comprise at least one of: samples in one or more neighboring lines at a top side of the current block, or samples in one or more neighboring columns at a left side of the current block.

4. The method of claim 3, wherein determining the multiple first picture component reference values according to the first picture component reference value set comprises:
   selecting two reference samples from the samples in the one or more neighboring lines at the top side of the current block according to a preset position, and selecting two reference samples from the samples in the one or more neighboring columns at the left side of the current block according to a preset position;
   determining the multiple first picture component reference values according to the four selected samples.

5. The method of claim 1, wherein determining the multiple filtered first picture reference sample values based on the set of greater first picture component reference values and set of smaller first picture component reference values comprises:
   performing mean processing on the set of greater first picture component reference values to obtain a filtered maximum first picture component reference value; and
   performing mean processing on the set of smaller first picture component reference values to obtain a filtered minimum first picture component reference value.

6. The method of claim 5, further comprising:
   determining a maximum to-be-predicted picture component reference value corresponding to the filtered maximum first picture component reference value and a minimum to-be-predicted picture component reference value corresponding to the filtered minimum first picture component reference value.

7. The method of claim 6, wherein determining the parameter of the component linear model according to the multiple filtered first picture reference sample values and a corresponding to-be-predicted picture component reference values comprises:
   determining the parameter of the component linear model according to the filtered maximum first picture component reference value, the maximum to-be-predicted picture component reference value, the filtered minimum first picture component reference value and the minimum to-be-predicted picture component reference value, the component linear model characterizing the linear mapping relationship for mapping the sample value of the first picture component to the sample value of the to-be-predicted picture component.

8. The method of claim 7, wherein determining the parameter of the component linear model according to the filtered maximum first picture component reference value, the maximum to-be-predicted picture component reference value, the filtered minimum first picture component reference value and the minimum to-be-predicted picture component reference value comprises:
   constructing a first sub component linear model by using the filtered maximum first picture component reference value, the maximum to-be-predicted picture component reference value and a preset initial linear model;
   constructing a second sub component linear model by using the filtered minimum first picture component reference value, the minimum to-be-predicted picture component reference value and the preset initial linear model;

obtaining a model parameter based on the first sub component linear model and the second sub component linear model; and constructing the component linear model by using the model parameter and the preset initial linear model.

9. The method of claim 7, wherein determining the parameter of the component linear model according to the filtered maximum first picture component reference value, the maximum to-be-predicted picture component reference value, the filtered minimum first picture component reference value and the minimum to-be-predicted picture component reference value comprises:

the parameter of the component linear model comprises a multiplicative factor and an additive offset;

calculating a first difference value between the maximum to-be-predicted picture component reference value and the minimum to-be-predicted picture component reference value;

calculating a second difference value between the maximum first picture component reference value and the minimum first picture component reference value;

setting the multiplicative factor to be a ratio of the first difference value to the second difference value; and calculating a first product between the maximum first picture component reference value and the multiplicative factor and setting the additive offset to be a difference value between the maximum to-be-predicted picture component reference value and the first product; or calculating a second product between the minimum first picture component reference value and the multiplicative factor and setting the additive offset to be a difference value between the minimum to-be-predicted picture component reference value and the second product.

10. The method of claim 6, wherein determining the maximum to-be-predicted picture component reference value corresponding to the filtered maximum first picture component reference value and the minimum to-be-predicted picture component reference value corresponding to the filtered minimum first picture component reference value comprises:

acquiring to-be-predicted picture component reference values of the reference samples in the set of greater first picture component reference values and to-be-predicted picture component reference values of the reference samples in the set of smaller first picture component reference values;

performing meaning processing on the to-be-predicted picture component reference values of the reference samples in the set of greater first picture component reference values, and determining the maximum to-be-predicted picture component reference value; and performing meaning processing on the to-be-predicted picture component reference values of the reference samples in the set of smaller first picture component reference values, and determining minimum to-be-predicted picture component reference value.

11. The method of claim 10, further comprising:

performing fourth filtering processing on the to-be-predicted picture component reference value to obtain a reconstructed value of the to-be-predicted picture component, wherein fourth filtering processing is low-pass filtering.

12. The method of claim 10, further comprising:

converting a first picture component reference value sample position corresponding to the filtered maximum first picture component reference value into a first sample position;

setting the maximum to-be-predicted picture component reference value to be a reference value of the to-be-predicted picture component reference values which is at the first sample position;

converting a first picture component reference value sample position corresponding to the filtered minimum first picture component reference value into a second sample position; and setting the minimum to-be-predicted picture component reference value to be a reference value of the to-be-predicted picture component reference values which is at the second sample position.

13. The method of claim 1, wherein a number of sample values in the set of greater first picture component reference values is an integer which is equal to or greater than 1, and a number of sample values in the set of smaller first picture component reference values is an integer which is equal to or greater than 1, wherein the number of sample values in the set of greater first picture component reference values is 2, and a number of sample values in the set of smaller first picture component reference values is 2.

14. The method of claim 1, wherein performing mapping processing on the reconstructed value of the first picture component of the current block according to the component linear model to obtain the mapped value comprises:

performing second filtering processing on the reconstructed value of the first picture component to obtain a second filtered value of the reconstructed value of the first picture component; and performing mapping processing on the second filtered value according to the component linear model to obtain the mapped value, wherein second filtering processing is down-sampling filtering or low-pass filtering.

15. The method of claim 1, wherein determining the predicted value of the to-be-predicted picture component of the current block according to the mapped value comprises:

setting the mapped value as the predicted value of the to-be-predicted picture component of the current block.

16. The method of claim 1, wherein determining the predicted value of the to-be-predicted picture component of the current block according to the mapped value comprises:

performing third filtering processing on the mapped value to obtain a third filtered value of the mapped value; and setting the third filtered value as the predicted value of the to-be-predicted picture component of the current block, wherein third filtering processing is low-pass filtering.

17. The method of claim 1, wherein the first picture component is a luma component, and the to-be-predicted picture component is a first or second chroma component; or the first picture component is the first chroma component, and the to-be-predicted picture component is the luma component or the second chroma component; or the first picture component is the second chroma component, and the to-be-predicted picture component is the luma component or the first chroma component; or the first picture component is a first colour component, and the to-be-predicted picture component is a second colour component or a third colour component; or the first picture component is the second colour component, and the to-be-predicted picture component is the first colour component or the third colour component; or the first picture component is the third colour component, and the to-be-predicted picture component is the second colour component or the first colour component, wherein the first colour component is a red component, the second colour component is a green component, and the third colour component is a blue component.

18. The method of claim 1, wherein
first filtering processing is down-sampling filtering or low-pass filtering.

19. A picture component prediction method, applied to an encoder, the method comprising:
determining a first picture component reference value set of a current block;
determining multiple first picture component reference values according to the first picture component reference value set, wherein the multiple first picture component reference values include four reference values corresponding to four preset sample positions, respectively;
performing first filtering processing on sample values of samples corresponding to the multiple first picture component reference values, respectively, to determine multiple filtered first picture reference sample values, wherein the first filtering processing is performed on the sample values of the samples corresponding to the multiple first picture component reference values to obtain a filtered reference value set, and wherein reference sample values in the filtered reference value set are compared, and wherein a set of greater first picture component reference values and a set of smaller first picture component reference values are determined based on the reference sample values, and wherein the multiple filtered first picture reference sample values are determined by using multiple values from each of the set of greater first picture component reference values and the set of smaller first picture component reference values;
determining a parameter of a component linear model according to the multiple filtered first picture reference sample values and a corresponding to-be-predicted picture component reference values, the to-be-predicted picture component being a picture component which is different from the first picture component, and the component linear model characterizing a linear mapping relationship for mapping a sample value of the first picture component to a sample value of the to-be-predicted picture component;
performing mapping processing on a reconstructed value of the first picture component of the current block according to the component linear model to obtain a mapped value; and
determining a predicted value of the to-be-predicted picture component of the current block according to the mapped value.

20. A video component prediction device, applied to a decoder, the device comprising:
a memory for storing executable video component prediction instructions;
a processor for executing the executable video component prediction instructions stored in the memory to perform operations of:
determining a first picture component reference value set of a current block;
determining multiple first picture component reference values according to the first picture component reference value set, wherein the multiple first picture component reference values include four reference values corresponding to four preset sample positions, respectively;
performing first filtering processing on sample values of samples corresponding to the multiple first picture component reference values, respectively, to determine multiple filtered first picture reference sample values, wherein the first filtering processing is performed on the sample values of the samples corresponding to the multiple first picture component reference values to obtain a filtered reference value set, and wherein reference sample values in the filtered reference value set are compared, and wherein a set of greater first picture component reference values and a set of smaller first picture component reference values are determined based on the reference sample values, and wherein the multiple filtered first picture reference sample values are determined by using multiple values from each of the set of greater first picture component reference values and the set of smaller first picture component reference values;
determining a parameter of a component linear model according to the multiple filtered first picture reference sample values and a corresponding to-be-predicted picture component reference values, the to-be-predicted picture component being a picture component which is different from the first picture component, and the component linear model characterizing a linear mapping relationship for mapping a sample value of the first picture component to a sample value of the to-be-predicted picture component;
performing mapping processing on a reconstructed value of the first picture component of the current block according to the component linear model to obtain a mapped value; and
determining a predicted value of the to-be-predicted picture component of the current block according to the mapped value.

21. The device of claim 20, wherein determining the first picture component reference value set of a current block comprises:
determining one or more reference samples that locate outside of the current block, and determining the one or more reference samples as the first picture component reference value set.

22. The device of claim 21, wherein determining the one or more reference samples that locate outside of the current block comprises:
determining neighboring samples of the current block as one or more reference samples.

23. The device of claim 22, wherein determining the multiple first picture component reference values according to the first picture component reference value set comprises:
selecting two reference samples from the samples in the one or more neighboring lines at the top side of the current block according to a preset position, and selecting two reference samples from the samples in the one or more neighboring columns at the left side of the current block according to a preset position;
determining the multiple first picture component reference values according to the four selected samples.

24. The device of claim 20, wherein determining the multiple filtered first picture reference sample values based on the set of greater first picture component reference values and set of smaller first picture component reference values comprises:
performing mean processing on the set of greater first picture component reference values to obtain a filtered maximum first picture component reference value; and
performing mean processing on the set of smaller first picture component reference values to obtain a filtered minimum first picture component reference value.

25. The device of claim 24, further comprising:
determining a maximum to-be-predicted picture component reference value corresponding to the filtered maximum first picture component reference value and a minimum to-be-predicted picture component reference value corresponding to the filtered minimum first picture component reference value.

26. The device of claim 25, wherein determining the parameter of the component linear model according to the multiple filtered first picture reference sample values and a corresponding to-be-predicted picture component reference values comprises:
determining the parameter of the component linear model according to the filtered maximum first picture component reference value, the maximum to-be-predicted picture component reference value, the filtered minimum first picture component reference value and the minimum to-be-predicted picture component reference value, the component linear model characterizing the linear mapping relationship for mapping the sample value of the first picture component to the sample value of the to-be-predicted picture component.

27. The device of claim 20, wherein a number of sample values in the set of greater first picture component reference values is an integer which is equal to or greater than 1, and a number of sample values in the set of smaller first picture component reference values is an integer which is equal to or greater than 1,
wherein the number of sample values in the set of greater first picture component reference values is 2, and a number of sample values in the set of smaller first picture component reference values is 2.

28. A video component prediction device, applied to a decoder, the device comprising:
a memory for storing executable video component prediction instructions;
a processor for executing the executable video component prediction instructions stored in the memory to perform operations of:
determining a first picture component reference value set of a current block;
determining multiple first picture component reference values according to the first picture component reference value set, wherein the multiple first picture component reference values include four reference values corresponding to four preset sample positions, respectively;
performing first filtering processing on sample values of samples corresponding to the multiple first picture component reference values, respectively, to determine multiple filtered first picture reference sample values, wherein the first filtering processing is performed on the sample values of the samples corresponding to the multiple first picture component reference values to obtain a filtered reference value set, and wherein reference sample values in the filtered reference value set are compared, and wherein a set of greater first picture component reference values and a set of smaller first picture component reference values are determined based on the reference sample values, and wherein the multiple filtered first picture reference sample values are determined by using multiple values from each of the set of greater first picture component reference values and the set of smaller first picture component reference values;
determining a parameter of a component linear model according to the multiple filtered first picture reference sample values and a corresponding to-be-predicted picture component reference values, the to-be-predicted picture component being a picture component which is different from the first picture component, and the component linear model characterizing a linear mapping relationship for mapping a sample value of the first picture component to a sample value of the to-be-predicted picture component;
performing mapping processing on a reconstructed value of the first picture component of the current block according to the component linear model to obtain a mapped value; and
determining a predicted value of the to-be-predicted picture component of the current block according to the mapped value.

* * * * *